United States Patent
Wu

(10) Patent No.: US 8,800,764 B2
(45) Date of Patent: Aug. 12, 2014

(54) WATERTIGHT CASING FOR PORTABLE ELECTRONIC DEVICE

(71) Applicants: Fu Tai Hua Industry (Shenzhen) Co., Ltd., Shenzhen (CN); Hon Hai Precision Industry Co., Ltd., New Taipei (TW)

(72) Inventor: Jian-Guo Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/858,117

(22) Filed: Apr. 8, 2013

(65) Prior Publication Data

US 2014/0175961 A1    Jun. 26, 2014

(30) Foreign Application Priority Data

Dec. 21, 2012 (CN) .......................... 2012 1 0559196

(51) Int. Cl.
B65D 85/00 (2006.01)
H04M 1/00 (2006.01)

(52) U.S. Cl.
USPC ....................................... 206/320; 455/575.8

(58) Field of Classification Search
USPC ............. 455/90.3, 575.1, 575.8; 361/679.55, 361/679.56, 679.57, 679.58; 206/305, 320
See application file for complete search history.

(56) References Cited

U.S. PATENT DOCUMENTS

| | | | | |
|---|---|---|---|---|
| 5,285,894 | A * | 2/1994 | Kamata et al. | 206/316.1 |
| 7,158,376 | B2 * | 1/2007 | Richardson et al. | 361/679.56 |
| 7,733,642 | B2 * | 6/2010 | Liou et al. | 361/679.41 |
| 8,167,126 | B2 * | 5/2012 | Stiehl | 206/320 |
| 8,342,325 | B2 * | 1/2013 | Rayner | 206/320 |
| 8,395,894 | B2 * | 3/2013 | Richardson et al. | 361/679.55 |
| 8,446,713 | B2 * | 5/2013 | Lai | 361/679.02 |
| 8,453,835 | B2 * | 6/2013 | So | 206/320 |
| 8,503,170 | B1 * | 8/2013 | Hsu et al. | 361/679.02 |
| 8,536,453 | B2 * | 9/2013 | Qin | 174/50 |
| 2003/0095374 | A1 * | 5/2003 | Richardson | 361/681 |
| 2009/0215412 | A1 * | 8/2009 | Liu et al. | 455/90.3 |
| 2009/0260844 | A1 * | 10/2009 | Tseng | 174/50.5 |
| 2012/0043235 | A1 * | 2/2012 | Klement | 206/320 |
| 2012/0067711 | A1 * | 3/2012 | Yang | 200/341 |
| 2012/0262037 | A1 * | 10/2012 | Qin | 312/223.1 |
| 2012/0314354 | A1 * | 12/2012 | Rayner | 361/679.01 |

* cited by examiner

Primary Examiner — Darnell Jayne
Assistant Examiner — Patrick Hawn
(74) Attorney, Agent, or Firm — Novak Druce Connolly Bove + Quigg LLP

(57) ABSTRACT

A watertight casing includes a top cover, a transparent rubber sealing layer, a frame-shaped spacer, a loop-shaped rubber seal, and a bottom cover. The top cover defines a rib along the top cover. The bottom cover defines a receiving space and a slot surrounding the receiving space. The receiving space is to receive a portable electronic device. The slot is to receive the second rubber and the rib. The transparent rubber sealing layer is secured to the frame-shaped spacer and the top cover, and is sandwiched between the frame-shaped spacer and the top cover. When the top cover is secured to the bottom cover, the rib presses the frame-shaped rubber seal into the slot to deform the frame-shaped rubber seal, causing the slot to be filled with the deformed loop-shaped rubber seal.

2 Claims, 3 Drawing Sheets

WATERTIGHT CASING FOR PORTABLE ELECTRONIC DEVICE

BACKGROUND

1. Technical Field

The present disclosure relates to protective casings and, particularly, to a watertight casing of a portable electronic device.

2. Description of Related Art

Although various watertight casings can satisfy basic requirements, a new watertight casing for portable electronic devices is still needed.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
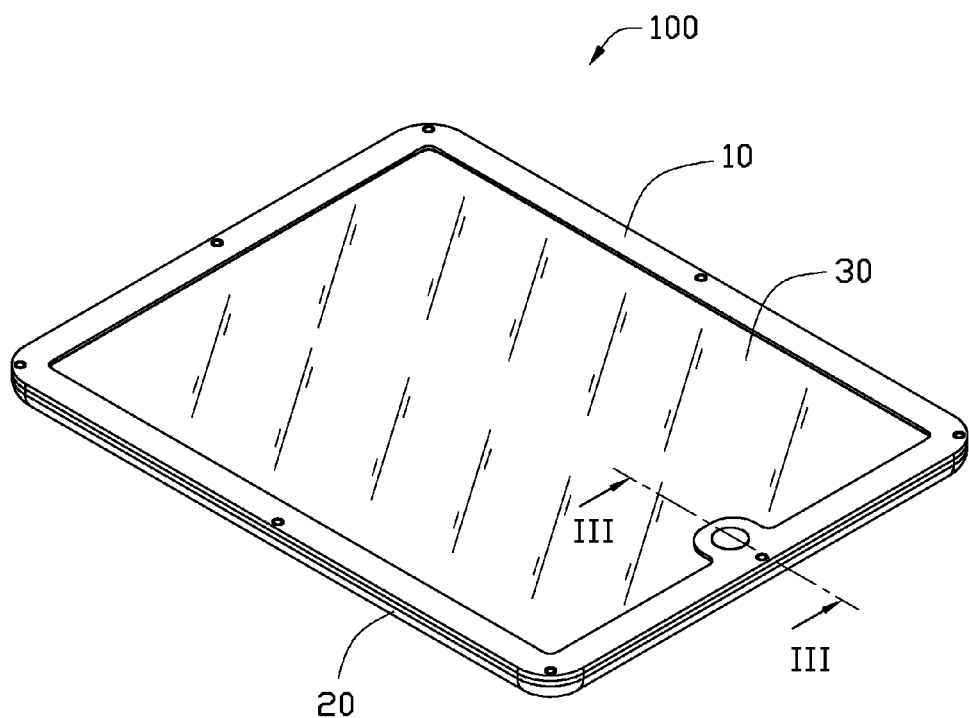
FIG. 1 is an isometric view of a watertight casing for portable electronic devices, in accordance with an exemplary embodiment.
Figure 2:
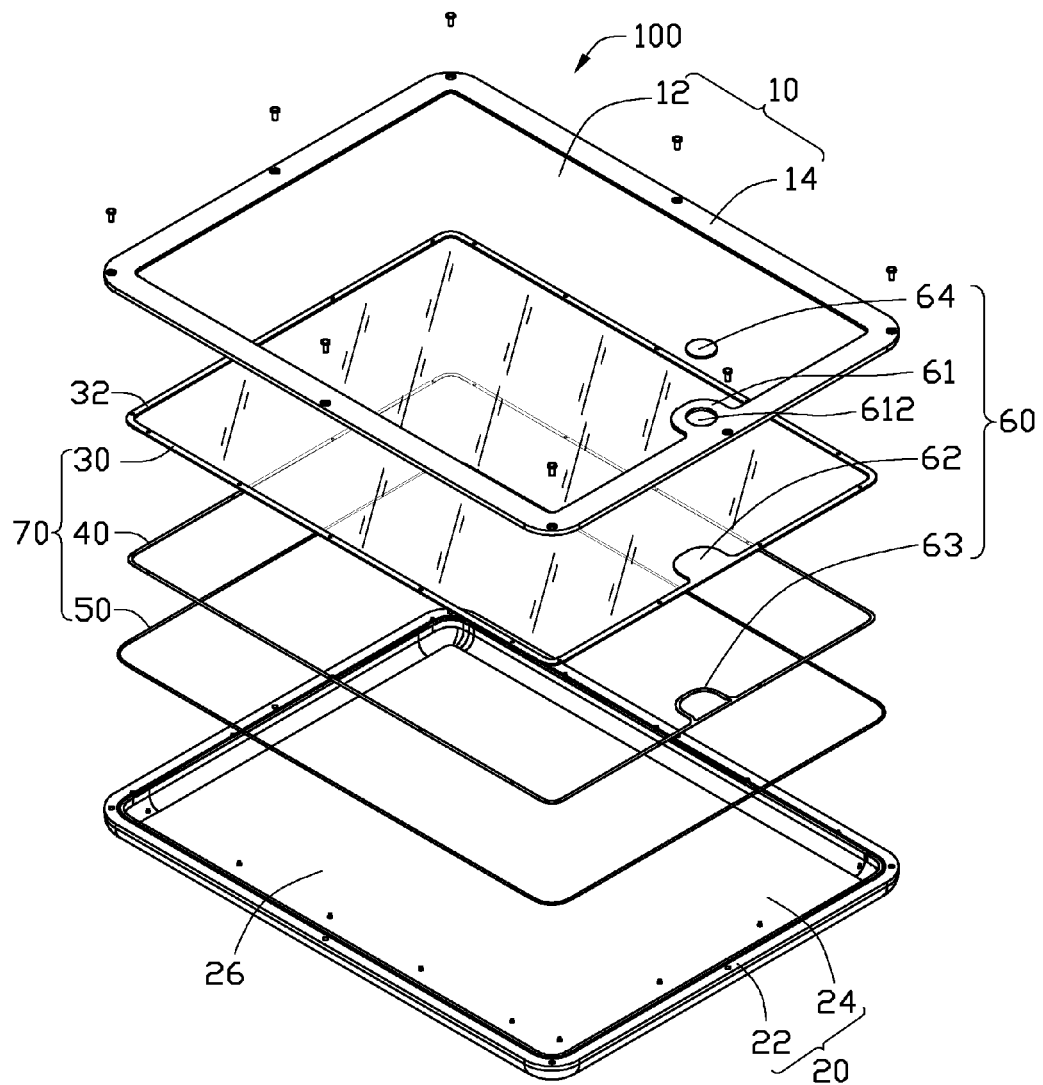
FIG. 2 is an exploded, perspective view of the watertight casing of FIG. 1.
Figure 3:
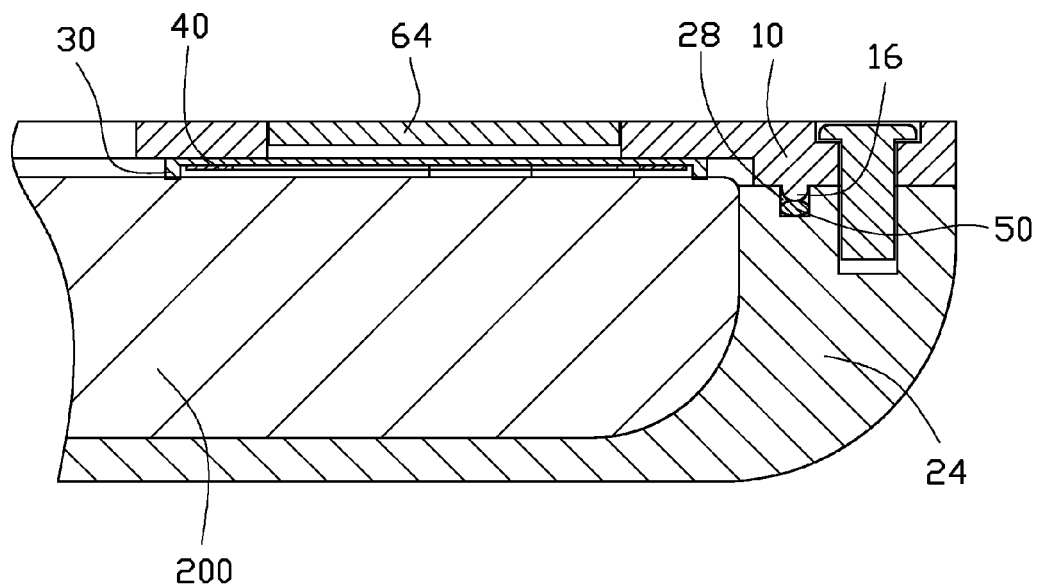
FIG. 3 is a cross-sectional view of the watertight casing of FIG. 1, taken along line III-III.

Referring to FIGS. 1-3, a watertight casing 100 for portable electronic devices 200 (e.g. tablet personal computers) includes a top cover 10, a bottom cover 20, and a hermetic or watertight seal 70. The top cover 10 includes an opening 12 and a top frame 14 surrounding the opening 12. The watertight seal 70 includes a transparent rubber sealing layer 30, a frame-shaped spacer 40, and a loop-shaped rubber seal 50. The seal 30 and the spacer 40 are secured to the top frame 14, and the seal 30 is sandwiched between the spacer 40 and the top cover 10. The bottom cover 20 includes a bottom 24 and a frame 22 surrounding the bottom 24 to form a receiving space 26 to receive the portable electronic device 200. The rubber seal 50 is arranged within the frame 22. To use the watertight casing 100, the portable electronic device 200 is placed in the receiving space 26, and a display (not shown) of the portable electronic device 200 is viewable. The top cover 10 is then secured to the bottom cover 20 by screws or other means. With the watertight seal 70, liquid (e.g. water) cannot enter the casing 100. Furthermore, as the rubber seal 30 is transparent, users can conveniently use the portable electronic device 200.

In this embodiment, a rib 16 is formed on an underside of the top frame 14. The frame 22 defines a slot 28 surrounding the third receiving space 26. The slot 28 receives the rubber seal 50. When the top cover 10 is secured to the bottom cover 20, the rib 16 is received in the slot 28 and presses the rubber seal 50 to deform the rubber seal 50, causing the slot 28 to be filled with the deformed rubber seal 50. Thus, liquid can be prevented from entering the watertight casing 100.

The watertight casing 100 further includes a button element 60. The button element 60 includes a first button frame 61, a pressing portion 62 arranged below the first button frame 61, and a second button frame 63 arranged below the pressing portion 62. The first button frame 61 extends from the top frame 12. The first button frame 61 defines a through hole 612. The pressing portion 62 extends from a frame 32 of the rubber seal 30. The second button frame 63 extends from the spacer 40. The button element 60 further includes a button cover 64 moveably received in the through hole 612. When the button cover 64 is pressed, the pressing portion 62 is correspondingly pressed.

To use the protecting casing 100, the portable electronic device 200 is placed in the third receiving space 26, and a screen (not shown) of the portable electronic device 200 is viewable. The top cover 10 is then secured to the bottom cover 20 to cause a home button (not shown) of the portable electronic device 200 to be arranged below the button element 60. When the top cover 10 is secured to the bottom cover 20, the rubber seal 30 covers the screen of the portable electronic device 200, and the rib 16 is received in the slot 28 and presses the rubber seal 50 to deform the rubber seal 50, causing the slot 28 to be filled with the deformed rubber seal 50. With the rubber seal 30 and the rubber seal 50, the protecting casing 100 can prevent liquid from entering the portable electronic device 200. Furthermore, as the rubber seal 30 is transparent, and the home button of the portable electronic device 200 is arranged below the button element 60, users can use the portable electronic device 200 conveniently.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A watertight casing for a portable electronic device:
   a top cover comprising an opening, a top frame surrounding the opening, and a rib formed on an underside of the top frame;
   a transparent rubber sealing layer;
   a frame-shaped spacer;
   a loop-shaped rubber seal; and
   a bottom cover defining a receiving space and a loop-shaped slot surrounding the receiving space, the receiving space being configured to receive the portable electronic device, the slot receiving the rubber seal and the rib;
   wherein, the transparent rubber sealing layer is secured to the frame-shaped spacer and the top cover, and is sandwiched between the frame-shaped spacer and the top cover, when the top cover is secured to the bottom cover, the rib presses the loop-shaped rubber seal into the slot to deform the loop-shaped rubber seal, causing the slot to be filled with the deformed loop-shaped rubber seal; and
   wherein the watertight casing further comprises a button element, the button element comprises a first button frame, a pressing portion, and a second button frame, the first button frame extends from the top frame, the pressing portion extends from the transparent rubber sealing layer, and the second button frame extends from the loop-shaped rubber seal.

2. The watertight casing as described in claim 1, wherein the first button frame defines a through hole, the button element further comprises a button cover moveably received in the through hole.

\* \* \* \* \*